Jan. 5, 1954　　　　　　　J. BARKER　　　　　　　2,664,876
PORTABLE COOKING DEVICE
Filed July 18, 1950　　　　　　　　　　　　　　2 Sheets-Sheet 2
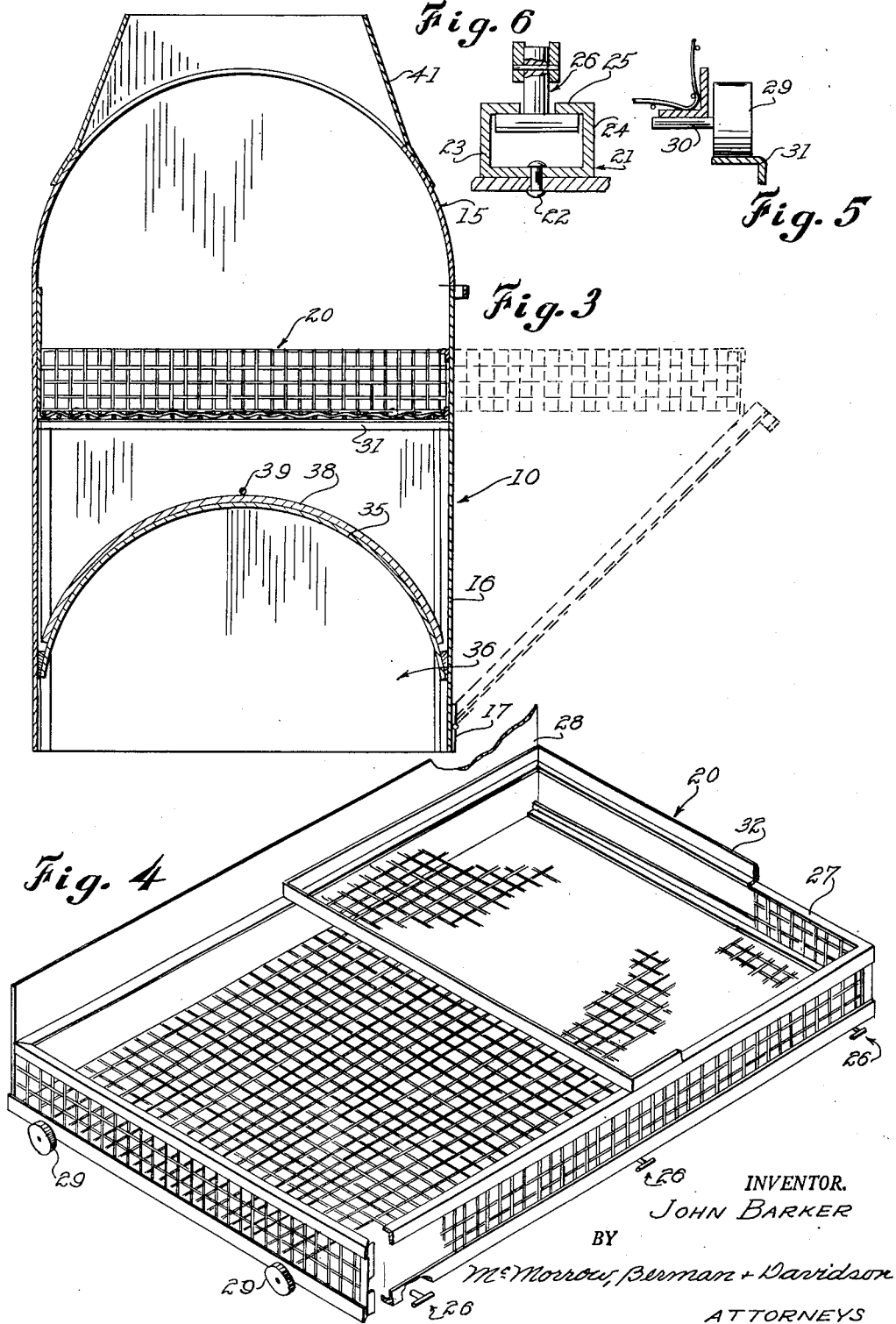
INVENTOR.
JOHN BARKER
BY
McMorrow, Berman & Davidson
ATTORNEYS Patented Jan. 5, 1954

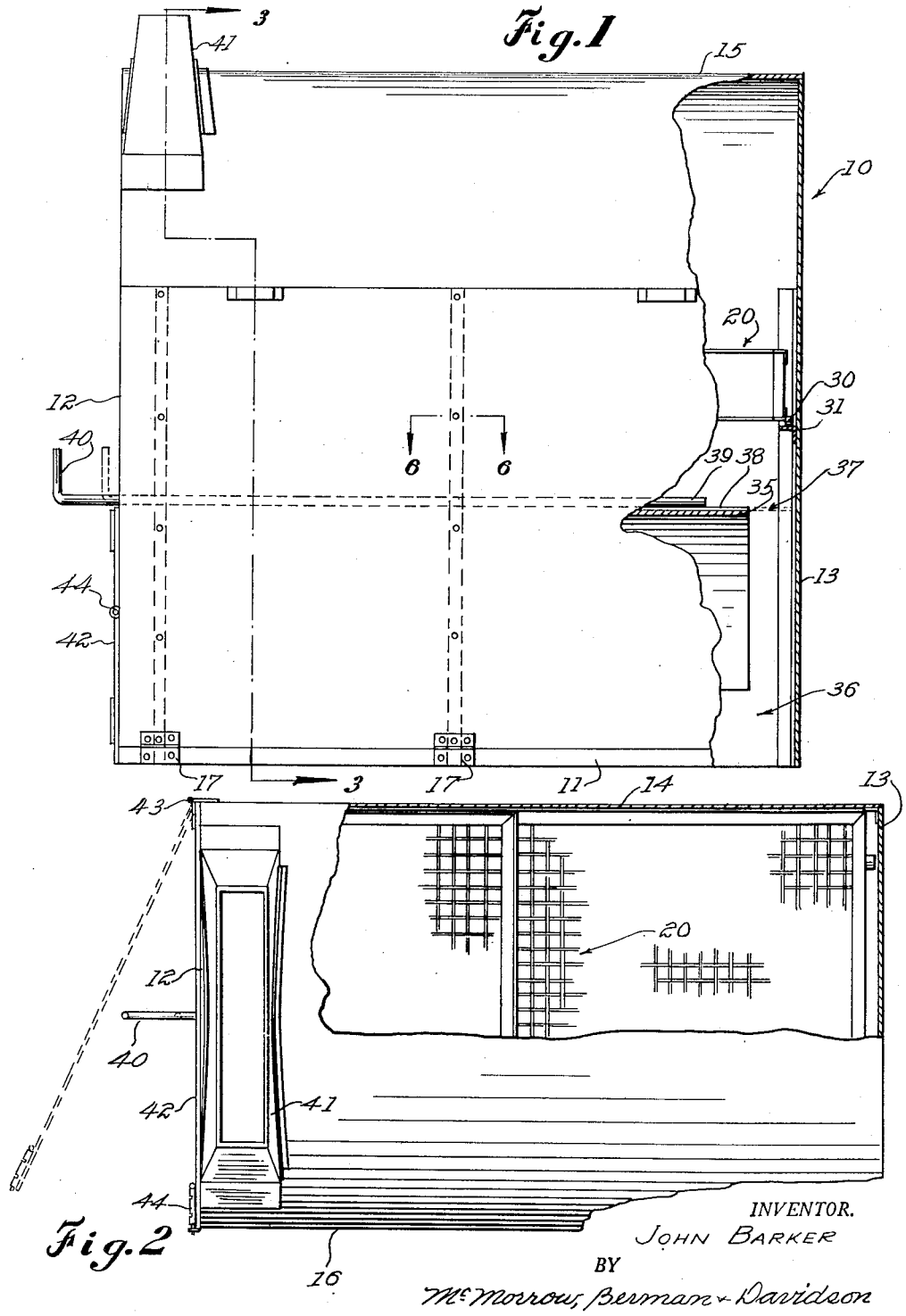

2,664,876

UNITED STATES PATENT OFFICE 2,664,876

PORTABLE COOKING DEVICE

John Barker, Centralia, Ill.

Application July 18, 1950, Serial No. 174,521

2 Claims. (Cl. 126—25)

This invention relates to a portable cooking stove.

An object of this invention is to provide a portable cooking stove which is particularly adapted to circulate the gases generated from the fire interiorly thereof.

Another object of this invention is to provide a portable cooking stove which is light and durable and is adapted to be heated by wood, charcoal, and the like.

A further object of this invention is to provide a portable cooking stove in which the several structural components are readily accessible for cleaning and dismantling.

A still further object of this invention is to provide a portable cooking stove which is relatively simple in structure and cheap to manufacture.

The above and still further objects and advantages of the invention will become apparent upon consideration of the following description of the invention, when taken in conjunction with the accompanying drawings, wherein:

Figure 1 is a side elevational view, with parts broken away and in section, of the portable cooking stove of the present invention;

Figure 2 is a top plan view, with parts broken away and in section of the cooking stove shown in Figure 1;

Figure 3 is a sectional view taken substantially along the line 3—3 of Figure 1;

Figure 4 is a perspective view, with parts broken away, of a cooking tray forming a part of the portable cooking stove of the present invention;

Figure 5 is an enlarged fragmentary view showing one of the wheels of the cooking tray illustrated in Figure 4; and Figure 6 is an enlarged fragmentary sectional view taken along the line 6—6 of Figure 1.

Referring now more particularly to the drawings, wherein like reference numerals have been used throughout the several views to designate like parts, there is shown the portable cooking stove of the present invention generally designated by the reference numeral 10 which includes a base 11. Disposed contiguous to each of the ends of the base 11 are the vertically disposed end walls 12, 13 each of which have their lower ends fixedly secured to the base 11. Arranged contiguous to one side of the base 11 and secured intermediate the end walls 12, 13 is a side wall 14. Resting upon the upper ends of the end walls 12, 13 and the side wall 14 and secured thereon is a closure hood 15. The base 11, the end walls 12, 13, the side wall 14 and the closure hood 15 cooperate together to form a stove body which is open on one side.

Positioned within the open side of the stove body is a second side wall 16 which has its lower end mounted on the adjacent side of the base 11 for swinging movement into and out of a supported position intermediate the ends walls 12, 13, the pivotal mounting being effected by means of the hinges 17.

Positioned within the stove body is a horizontally disposed cooking tray generally designated by the reference numeral 20, Figure 4, which is mounted for extensile and retractile movement with respect to the open side of the stove body. Any suitable means operatively connects the cooking tray 20 and the adjacent side wall 16 for effecting the extensile movement of the tray in response to the swinging movement of the side wall 16 out of its supported position intermediate the end walls 12, 13.

As clearly indicated in Figure 6, the means for operatively connecting the tray 20 to the side wall 16 includes a vertically extending channel member 21 disposed interiorly of the side wall 16 and having its web secured thereto by means of the rivets 22. The legs 23, 24 of the channel member 21 are turned inwardly and cooperate to form a longitudinally extending slot 25. Pivotally supported on the horizontally disposed tray 20 is a latch piece 26 which is engageable within the channel member 21 and is pivotally supported on the tray 20 for movement about a horizontal axis. Any number of cooperating channels 21, and latch pieces 26 may be provided at spaced intervals along the side walls 16 and the adjacent side of the tray 20 to effect the desired operative connection between the tray and the side wall 16.

Referring now with particularity to Figure 4, there is shown the cooking tray 20 which includes a rectangular drawer 27 having a closed bottom and open top, the side, end and bottom walls of the drawer 27 being fabricated of an open lattice work of wires. Contiguous to one side of the drawer 27 is secured a backing plate 28. At spaced intervals along each end of the drawer 27 there are mounted wheels, designated by the reference numeral 29. As clearly shown in Figure 5, the wheels 29 are rotatably supported on an axle 30 which underlies the adjacent portion of the bottom of the drawer 27 and is secured or welded thereto. As clearly shown in Figure 1, the wheels 29 of the drawer 27 are supported on angle irons 31 disposed transversely of and secured interiorly of each of the end walls 12, 13.

Overlying the open top of the drawer 27 is an auxiliary supporting ledge 32 which is similarly fabricated of an open lattice work of wire supported within a rectangular frame. The ledge 32 is somewhat shorter than the drawer 27 and can be selectively positioned in bridging relation along the open top of the drawer. Accordingly, the meat to be cooked can be supported within the drawer upon the auxiliary supporting ledge. During cooking, it may often be desired to support the meat in a position somewhat removed from the source of heat, and accordingly the auxiliary supporting ledge is often very useful.

Positioned within the stove body intermediate the cooking tray 20 and the base 11 is an arcuate roof 35 which is secured to the adjacent bounding portions of the stove body. The roof 35 has one end terminating contiguous to and spaced from the end wall 13, as clearly indicated in Figure 1, and cooperates with the base 11 and the adjacent portions of the side and end walls of the stove body to form a combustion chamber 36 having an outlet port 37.

Supported on the roof 35 is a damper 38 which is shaped complementary to the roof 35 and mounted on the latter for movement longitudinally thereof into and out of restricting relation with respect to the outlet port 37. Extending longitudinally of and overlying the roof 35 is an actuating rod 39 which has one end secured to the damper 38 and has the other end extending through the end wall 12 of the stove body and bent to form a handle 40. Accordingly the damper 38 can be moved by manually grasping the handle 40 and pulling or pushing the rod 39.

Contiguous to the end wall 12, the closure hood 15 carries a chimney 41 which is in communication with the interior of the stove body. Accordingly a circulating path is provided for the gases generated in the combustion chamber 36, the path including a circuitous route upwardly through the outlet port 37, through the horizontally disposed cooking tray 20, and upwardly and outwardly through the chimney 41.

The end wall 12 contiguous to the adjacent end of the combustion chamber 36 is provided with a rectilinear aperture, in which is supported a door 42 which is mounted by means of the hinges 43 for movement into and out of closing relation with respect to the aperture, the door being provided with a lock structure 44 for normally securing the door in its position of closing relation. Accordingly ready access is had to the adjacent end of the combustion chamber 36 for placing wood, charcoal or the like into the stove 10.

In actual use, the door 42 is moved to the open position indicated in Figure 2 by the broken lines, whereupon fuel can be inserted within the combustion chamber 36. Upon lighting a fire, within the combustion chamber 36, the gases generated by the fire will flow upwardly through the cooking tray 20. The heat generated by the firewood in the combustion chamber will elevate the temperature within the stove, and the cooking of the meat will be effected. During cooking, the cooking tray 20 may be removed from its supported position within the stove body in the extended position indicated by the broken lines in Figure 3, by moving the side wall about the pivotal axis provided by the hinges 17. It is to be noted that the drippings from the meat being cooked will flow downwardly along the interior of the side wall 16 when the tray 20 is supported in its extended position. Accordingly the meat can be examined during cooking without having the grease drippings soiling the adjacent supporting surface for the stove 10.

Although only one embodiment of the portable cooking stove of the present invention has been disclosed, it is readily apparent to one skilled in the art that numerous modifications can be made without departing from the spirit of the invention as set forth in the appended claims.

What I claim is:

1. A portable cooking stove comprising a base, a pair of vertically disposed end walls contiguous to each end of said base and having their lower ends secured thereto, a first side wall arranged contiguous to one side of said base intermediate said end walls and secured thereto, a closure hood resting upon the upper ends of said end walls and one side wall and secured thereto and cooperating with said base and said end walls and side wall to form a stove body having an open side, a second side wall disposed within the open side of said stove body and mounted on the outer side of said base for swinging movement into and out of a supported position intermediate said end walls, a horizontally disposed tray positioned within said stove body, horizontal tracks respectively adjacent each end wall and coextensive therewith, said tray being mounted on said tracks for horizontal extensile and retractile movement with respect to said open side, a track member having inturned flange elements secured to the inside wall surface of said second side wall and extending at right angles to the rotational axis of said second side wall, and a T-shaped lug on said tray secured to the edge thereof adjacent said open side and having its head slidably engaged in said track member and being freely movable therein for effective extensile movement of the tray in response to outward swinging movement of said second side wall, said stove body having an arcuate roof positioned therein intermediate said tray and said base and secured to said body, said roof having one end contiguous to and spaced from one end wall of said body and cooperating with said base and the adjacent portions of said side and end walls to form a combustion chamber.

2. A portable cooking stove comprising a base, a pair of vertically disposed end walls contiguous to each end of said base and having their lower ends secured thereto, a first side wall arranged contiguous to one side of said base intermediate said end walls and secured thereto, a closure hood resting upon the upper ends of said end walls and one side wall and secured thereto and cooperating with said base and said end walls and side wall to form a stove body having an open side, a second side wall disposed within the open side of said stove body and mounted on the outer side of said base for swinging movement into and out of a supported position intermediate said end walls, a horizontally disposed tray positioned within said stove body, horizontal tracks respectively adjacent each end wall and coextensive therewith, said tray being mounted on said tracks for horizontal extensile and retractile movement with respect to said open side, a track member having inturned flange elements secured to the inside wall surface of said second side wall and extending at right angles to the rotational axis of said second side wall, and a T-shaped lug on said tray secured to the edge thereof adjacent said open side and having its head slidably engaged in said track member and being freely movable therein for effective extensile movement of the tray responsive to outward swinging movement of said second side wall, said stove body having an arcuate roof positioned therein intermediate said tray and said base and secured to said body, said roof having one end contiguous to and spaced from one end wall of said body and cooperating with said base and the adjacent portions of said side walls and end wall to form a combustion chamber, said stove body having an outlet port coextensive with said roof, and arcuate damper means slidably supported on said roof for movement into and out of constricting relation with respect to said outlet port.

JOHN BARKER.

References Cited in the file of this patent

UNITED STATES PATENTS

| Number | Name | Date |
|---|---|---|
| 144,469 | Moore | Nov. 11, 1873 |
| 175,945 | Davis | Apr. 11, 1876 |
| 561,856 | Baxter | June 9, 1896 |
| 1,156,773 | Gordon | Oct. 12, 1915 |
| 1,371,105 | Marion | Mar. 8, 1921 |
| 1,487,950 | Kimmerle | Mar. 25, 1924 |
| 1,611,591 | Johnson | Dec. 21, 1926 |
| 1,650,529 | Montgomery | Nov. 22, 1927 |
| 1,938,470 | Teller | Dec. 5, 1933 |
| 2,162,975 | Schmidt | June 20, 1939 |
| 2,350,948 | Walker | June 6, 1944 |
| 2,372,672 | Hultgren | Apr. 3, 1945 |